United States Patent [19]
Martin

[11] Patent Number: 5,368,354
[45] Date of Patent: Nov. 29, 1994

[54] PICKUP BED CAP HAVING PASSENGER SEAT

[76] Inventor: Blake C. Martin, HC 84, Box 57, Keyser, W. Va. 26726

[21] Appl. No.: 71,825

[22] Filed: Jun. 7, 1993

[51] Int. Cl.⁵ .................................. B62D 25/00
[52] U.S. Cl. ............................... 296/64; 296/100
[58] Field of Search ............... 296/100, 63, 64, 39.2

[56] References Cited

U.S. PATENT DOCUMENTS

| | | | |
|---|---|---|---|
| D. 271,757 | 12/1983 | Miller | D12/156 |
| 3,512,828 | 3/1970 | Craft | 296/100 |
| 3,829,151 | 8/1974 | Fellenstein | 296/100 X |
| 4,834,599 | 5/1989 | Gordon et al. | 410/151 |
| 4,911,493 | 3/1990 | Muirhead | 296/39.2 |
| 5,029,928 | 7/1991 | Huber | 296/63 |
| 5,052,739 | 10/1991 | Irwin | 296/100 X |
| 5,056,856 | 10/1991 | Pederson | 296/100 |
| 5,215,346 | 6/1993 | Reitzloff et al. | 296/37.6 X |

FOREIGN PATENT DOCUMENTS 2205282 12/1988 United Kingdom ............... 296/100

*Primary Examiner*—Joseph Pape
*Attorney, Agent, or Firm*—Rhodes & Ascolillo

[57] ABSTRACT

A bed cover for covering the cargo bed of a truck and for providing additional passenger seating, the bed cover including a shell for attachment to the cargo bed, an apparatus for attaching the shell to the cargo bed, the shell having an interior opening passing therethrough, the opening facing upward when the shell is attached to the cargo bed, a passenger seat positioned within the opening, the passenger seat having a substantially horizontal bench portion positioned beneath the opening, and a device for shifting the horizontal bench portion of the passenger seat away from beneath the opening to thereby provide access to the interior of the cargo bed.

11 Claims, 3 Drawing Sheets

16
PICKUP BED CAP HAVING PASSENGER SEAT

BACKGROUND

1. Field of the Invention

The present invention relates to a cap for the cargo bed of a pickup truck that provides the pickup truck with additional passenger seating and also with sheltered storage compartments.

2. Description of the Related Art

U.S. Pat. No. 5,029,928 relates to a folding polyfoam or inflatable seat for a pickup truck bed that can be easily removed from the bed for use elsewhere, e.g., on the beach. The bench portion of the folding seat rests directly on the truck bed and may, in one embodiment disclosed, be somewhat secured there by tabs that slip over eyelet bolts attached to the bed.

U.S. Pat. No. 4,911,493 relates to a bed liner insert for a pickup truck having a passenger seat formed unitarily therewith. The bed liner conforms to the bed floor over its rearward portion and then extends upward to form the passenger seat adjacent the cab of the pickup truck.

U.S. Pat. No. 3,512,828 discloses a pickup bed cap that is in the form of a box panel construction, with beams that extend the width of the bed being sandwiched between fiat panels to yield a construction that is capable of supporting several thousand pounds. Storage compartments are accessible through doors provided in the upper panel, and one embodiment is capable of being raised and fitted with canvas sidewalls to form a camper over the bed.

U.S. Pat. No. 4,834,599 discloses a truck bed divider in the form of two arm members that extend outward from a centrally located connector and engage the sidewalls of the pickup truck bed via suction cups to restrain cargo loaded in the bed.

U.S. Pat. Des. No. 271,757 discloses a design for a pickup truck bed cover.

SUMMARY OF THE INVENTION

In one aspect, the invention generally features a bed cover for covering the cargo bed of a truck and for providing additional passenger seating, the bed cover including: a shell for attachment to the cargo bed; a device for attaching the shell to the cargo bed; the shell having an interior opening passing therethrough, the opening facing upward when the shell is attached to the cargo bed; a passenger seat positioned within the opening; the passenger seat having a substantially horizontal bench portion positioned beneath the opening; and a device for shifting the horizontal bench portion of the passenger seat away from beneath the opening to thereby provide access to the interior of the cargo bed.

Preferably, the device for shifting includes a pivot connection between the shell and the passenger seat; the passenger seat additionally includes a back portion, the back portion being disposed at a substantially right angle to the bench portion, and the pivot connection includes a pivoting connection between the shell and the back portion, the pivoting connection providing a pivoting movement of the back portion about a point substantially above the midpoint of the back portion.

In another aspect, the invention generally features a cargo bed cover for attachment to the cargo bed of a pickup truck to provide the pickup truck with additional passenger seating and at least one sheltered storage compartment, the cargo bed of the pickup truck having a cargo bed floor and upstanding cargo bed side walls, the cargo bed cover including: a cover shell for attachment to the cargo bed; a device for attaching the cover shell to the cargo bed; the cover shell extending over a substantial portion of the cargo bed when attached to the cargo to bed; at least one opening provided in the cover shell; a passenger seat including a seat bench and a seat back, the seat back being disposed transversely with respect to the seat bench; the passenger seat being disposed at least partially within the at least one opening in the cover shell; and a device for shifting the passenger seat between a seating position, wherein the seat bench is in a substantially horizontal orientation and the seat back is in a substantially vertical orientation, and a storage position, wherein the seat bench is in a substantially vertical orientation and the seat back is in a substantially horizontal orientation.

Preferably, the device for shifting the passenger seat includes a pivot mounting between the passenger seat and the cover shell, the pivot mounting providing a pivoting movement of the seat back with respect to the cover shell about an axis of rotation that is substantially transverse to the longitudinal axis of the pickup truck when the cover shell is attached to the cargo bed; the pickup truck has at least two wheel wells extending into the cargo bed, and the pivot mounting is located substantially over the wheel wells when the cover shell is attached to the cargo bed; the cargo bed cover additionally includes a first lid, the first lid covering a portion of the at least one opening provided in the cover shell, and the first lid is removable from the at least one opening to thereby expose the portion of the at least one opening; the first lid is located aft of the passenger seat when the cargo bed cover is mounted on the pickup truck; the cargo bed cover additionally includes a hinged connection between the cover shell and the first lid; the cargo bed cover additionally includes a magnetic latch mechanism, the magnetic latch mechanism including a magnet located on the cover shell and another magnet located on the first lid; the cargo bed cover additionally includes a second lid, the second lid covering another portion of the at least one opening in the cover shell, and the second lid is removable from the at least one opening to thereby expose the another portion of the at least one opening; the cargo bed further includes a hinged connection between the cover shell and the second lid; the cargo bed cover additionally includes a latching mechanism for retaining the passenger seat in the storage position, the latching mechanism including a first latch component mounted on the passenger seat and a second latch component mounted on the second lid; the cargo bed cover additionally includes a partition extending downward from the cover shell and towards the bed floor to thereby effectively divide the interior of the cargo bed into a plurality of compartments; the cargo bed cover further includes a device for removing the partition from the interior of the cargo bed; the cargo bed cover additionally includes a locking device for locking the passenger seat into the seating position; the locking device includes a pair of sliding bolt mechanisms, one each of the pair of sliding bolt mechanisms being positioned adjacent one each of the wheel wells of the pickup truck; the pivot mounting between the passenger seat and the cover shell is disposed on the seat back of the passenger seat, the pivot mounting being located substantially above the midpoint of the seat back when the seat back is in the substantially vertical orientation, and the device for attaching the cover shell to the cargo bed includes a pair of channels provided on the cover shell, one each of the pair of channels being located on one each of an opposing longitudinal side of the cover shell, and a pair of rails for slidingly engaging the pair of channels, one each of the pair of rafts being attached to one each of the upstanding cargo bed sidewalls.

In a still further aspect, the invention features a cargo bed cover for attachment to the cargo bed of a pickup truck to provide the pickup truck with additional passenger seating and sheltered storage compartments, the cargo bed of the pickup truck having a cargo bed floor, rear wheel wells extending into the cargo bed, and upstanding cargo bed side walls, the cargo bed cover including: a cover shell for attachment to the side walls of the cargo bed; an attachment device for attaching the cover shell to the side walls of the cargo bed; the attachment device including a pair of rails, one each of the pair of rails being mounted on one each of the side walls of the cargo bed, and a pair of mounting channels attached to the cover shell, one each of the mounting channels being configured to slidingly mate with one each of the rails; an interior opening passing through the cover shell; a passenger seat disposed beneath the opening in the cover shell when the cargo bed cover is mounted on the pickup truck; the passenger seat including a bench portion and a back portion; the bench portion and the back portion being disposed at substantially right angles to one another; a device for selectively shifting the passenger seat between: a first position wherein the bench portion is substantially horizontally oriented and the back portion is substantially vertically oriented; and a second position wherein the bench portion is substantially vertically oriented and the back portion is substantially horizontally oriented; the device for selectively shifting including a pivoting connection between the cover shell and the back portion; the pivoting connection between the cover shell and the back portion being substantially disposed over the rear wheel wells of the pickup truck; a first lid for covering a portion of the opening; the first lid being positioned rearward of the passenger seat when the cargo bed cover is mounted on the pickup truck; a hinge interconnecting the first lid and the cover shell; a magnetic catch for retaining the first lid in an open position, the magnetic catch including one magnetic member attached to the first lid and another magnetic member attached to the cover shell; a second lid covering another portion of the opening; the second lid being positioned forward of the passenger seat when the cover shell is mounted on the pickup truck; an additional hinge interconnecting the second lid and the cover shell; a latch for retaining the passenger seat in the second position, the latch including a rotatable latch member mounted on the second lid and a retainer member mounted on the passenger seat; a handle mounted on the seat back for shifting the passenger seat between the first and second positions; a locking mechanism for retaining the passenger seat in the first position; and a partition for dividing the cargo bed of the pickup truck into a plurality of compartments.

Preferably, the cargo bed cover additionally includes a device for substantially removing the partition from the interior of the cargo bed, and the locking mechanism includes a pair of slide bolt locking devices, each of the slide bolt locking devices including a sliding bolt and a locking aperture for receiving the sliding bolt, one each of the sliding bolts being disposed on one each of the rear wheel wells and one each of the locking apertures being disposed on the seat back adjacent one each of the rear wheel wells when the passenger seat is in the first position.

One object of the present invention is the provision of a covering cap for a truck bed that also furnishes additional passenger seating.

Another object of the invention is the provision of such a truck bed cap that also provides, in addition to extra seating, sheltered compartments for storage of items such as groceries, tools, etc.

A still further object of the invention is the provision of such a truck bed cap that is nevertheless both stable and sturdy.

The truck bed cap disclosed herein is flexible in that it can be used to transport both people and/or cargo. The provided passenger seat can be rotated and latched out of the way, if additional cargo storage is required. Additionally, for the transport of just a few small items, an optional partition prevents these items from sliding to the front of the bed and, consequently somewhat out of reach.

Stability and safety are enhanced by producing the seat and compartment as one solid unit.

The invention will now be described by way of a particularly preferred embodiment, reference being made to the accompanying drawings, wherein:

DESCRIPTION OF THE PREFERRED EMBODIMENT

Figure 1:
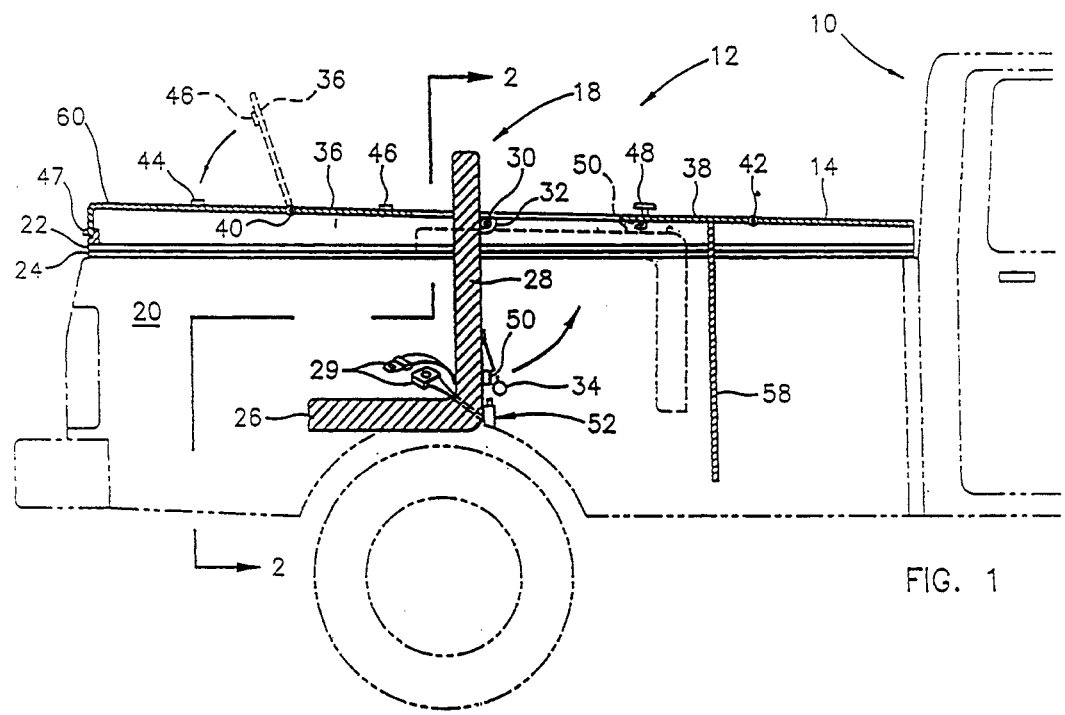
FIG. 1 is a side elevation sectional view, along the section lines indicated in FIG. 3, of a pickup truck having mounted on the cargo bed thereof a cargo bed cover constructed according to the present invention.

Referring now to all of FIGS. 1–5, a pickup truck 10 has mounted thereon a cargo bed cover 12, which is constructed according to the invention and which generally includes a shell 14 covering the cargo bed and having an interior opening (or window) 16 provided therein and a passenger seat 18 located generally within the perimeter of the opening 16.

Figure 2:
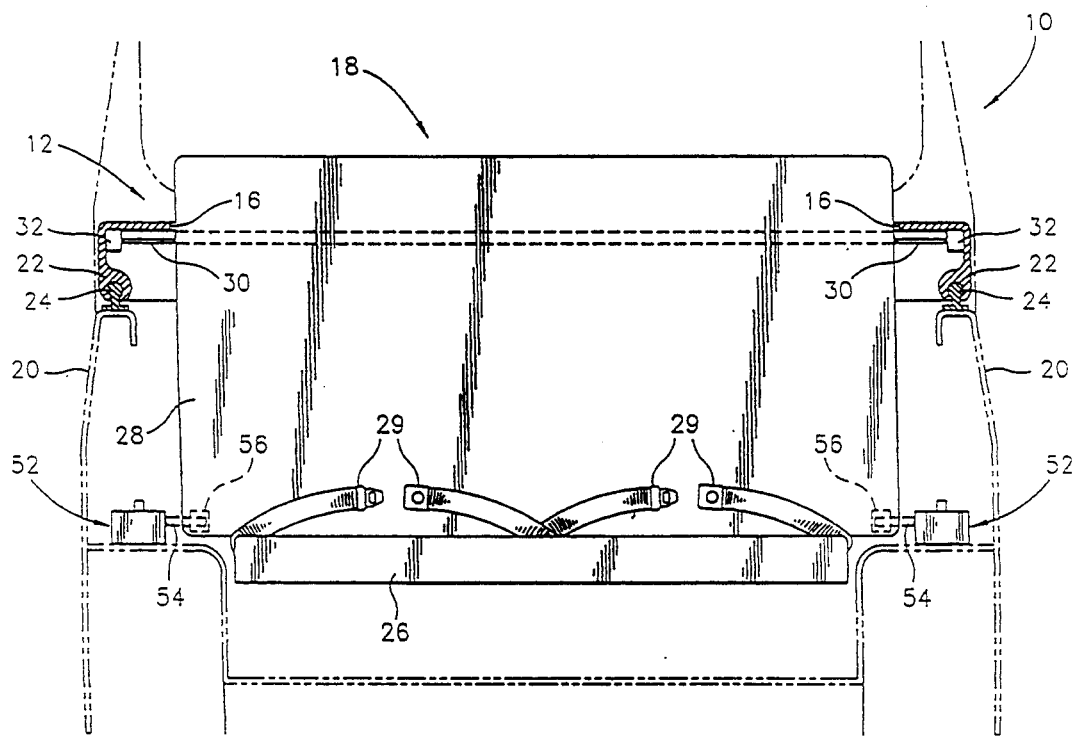
FIG. 2 is a rear elevation sectional view, along the section lines indicated in FIG. 1, of the pickup truck with the inventive cargo bed cover mounted thereon.
Figure 3:
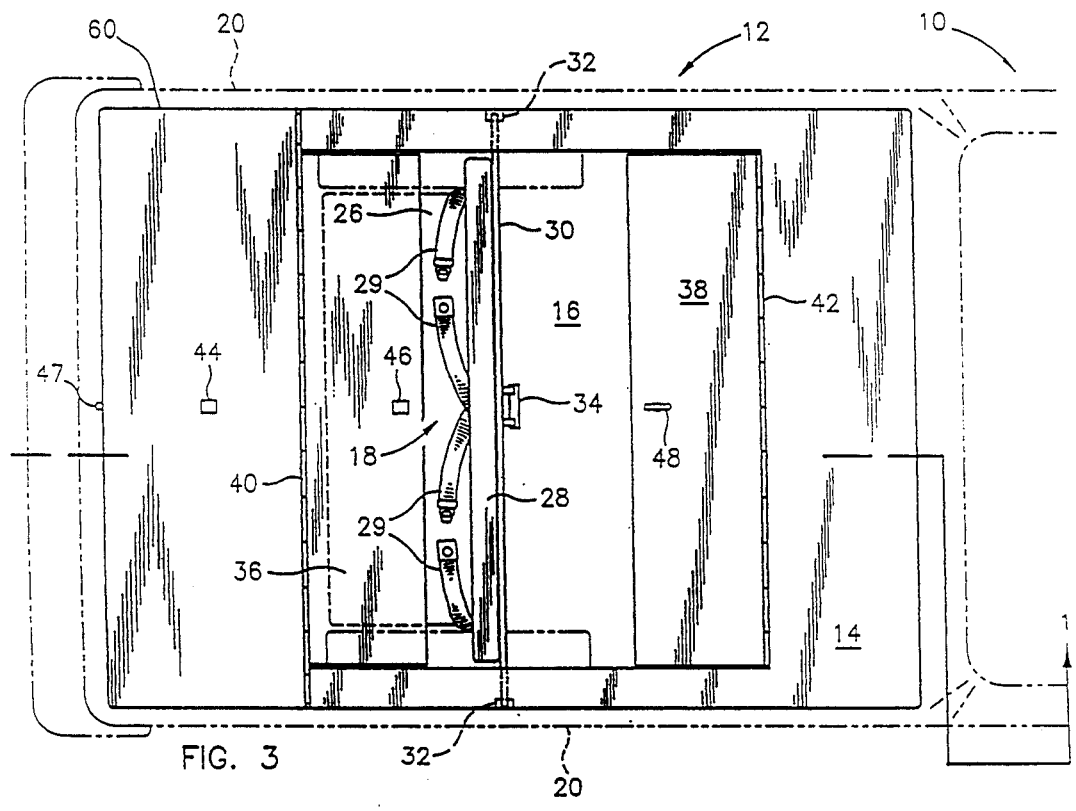
FIG. 3 is a top plan view of the truck and cargo bed cover, wherein the a passenger seat of the invention is shown in its seating position, and wherein two lids, positioned fore and aft of the passenger seat are both shown in their closed positions.

As is shown most clearly in FIG. 2, the shell 14 is attached to the side panels (or side rails) 20 of the pickup truck 10. Preferably, this is accomplished through the provision of a pair of mounting channels 22 provided on the opposing sides of the shell 14 that slidingly engage a pair of rails 24 that are attached (e.g., by bolting, welding, etc.) to the upper surfaces of the side panels 20. Of course, the shell 14 could be directly attached to the side panels 20 by bolting or welding.

The passenger seat 18 includes a bench portion 26 that has, in the seating position shown in FIGS. 1–3 and 5, a generally horizontal orientation, and a back portion 28 that has, in the seating position, a generally vertical orientation. The passenger seat 18 is preferably equipped with a pair of seat belts or seat harnesses 29. A pivot connection is provided between the passenger seat 18 and the shell 14 that allows the passenger seat 18 to be swung around an axis that is generally transverse to the longitudinal axis of the cargo bed cover 12, that is, transverse to the longitudinal length (i.e., direction of travel) of the pickup truck 10. In the preferred embodiment illustrated, the pivot connection includes a cylindrical bar 30 that is fixedly attached to the seat back 28 and that extends transversely across the cargo bed of the pickup truck 10. The bar 30 is pivotable within a pair of brackets 32 that are attached to the under surface of the shell 14.

Figure 4:
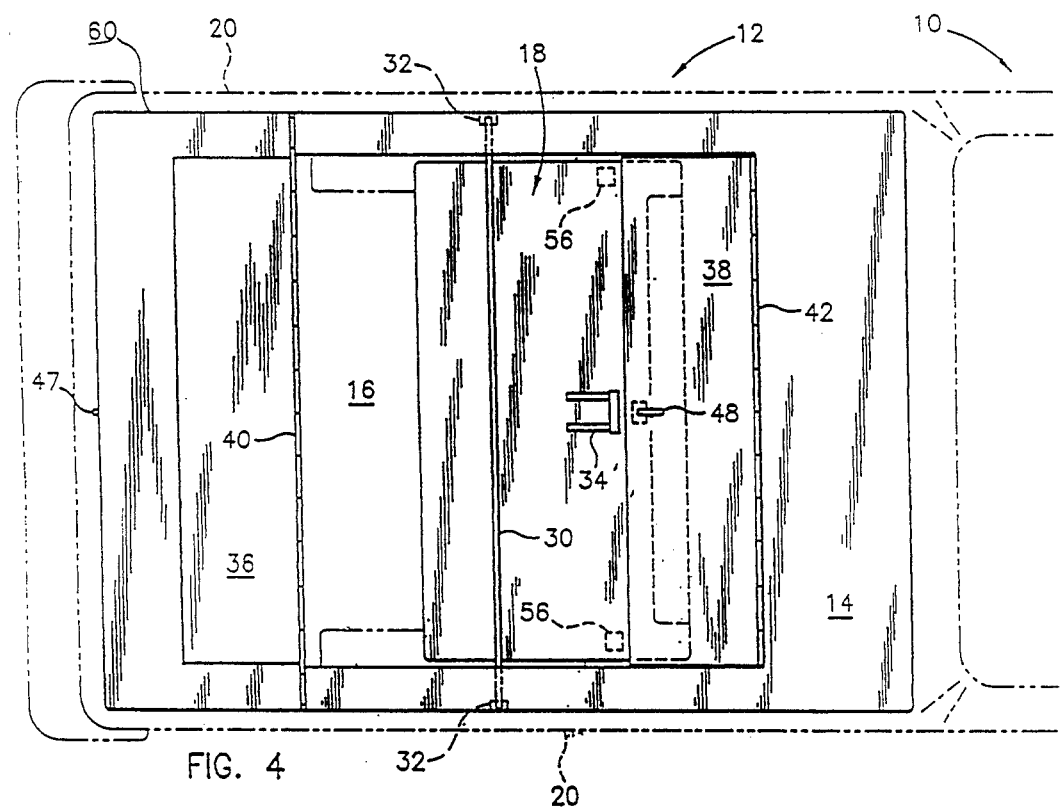
FIG. 4 is another top plan view of the truck and the cargo bed cover, with, however, the passenger seat being shown in its storage position, the fore lid being shown in its closed position, and the aft lid being shown in its open position.
Figure 5:
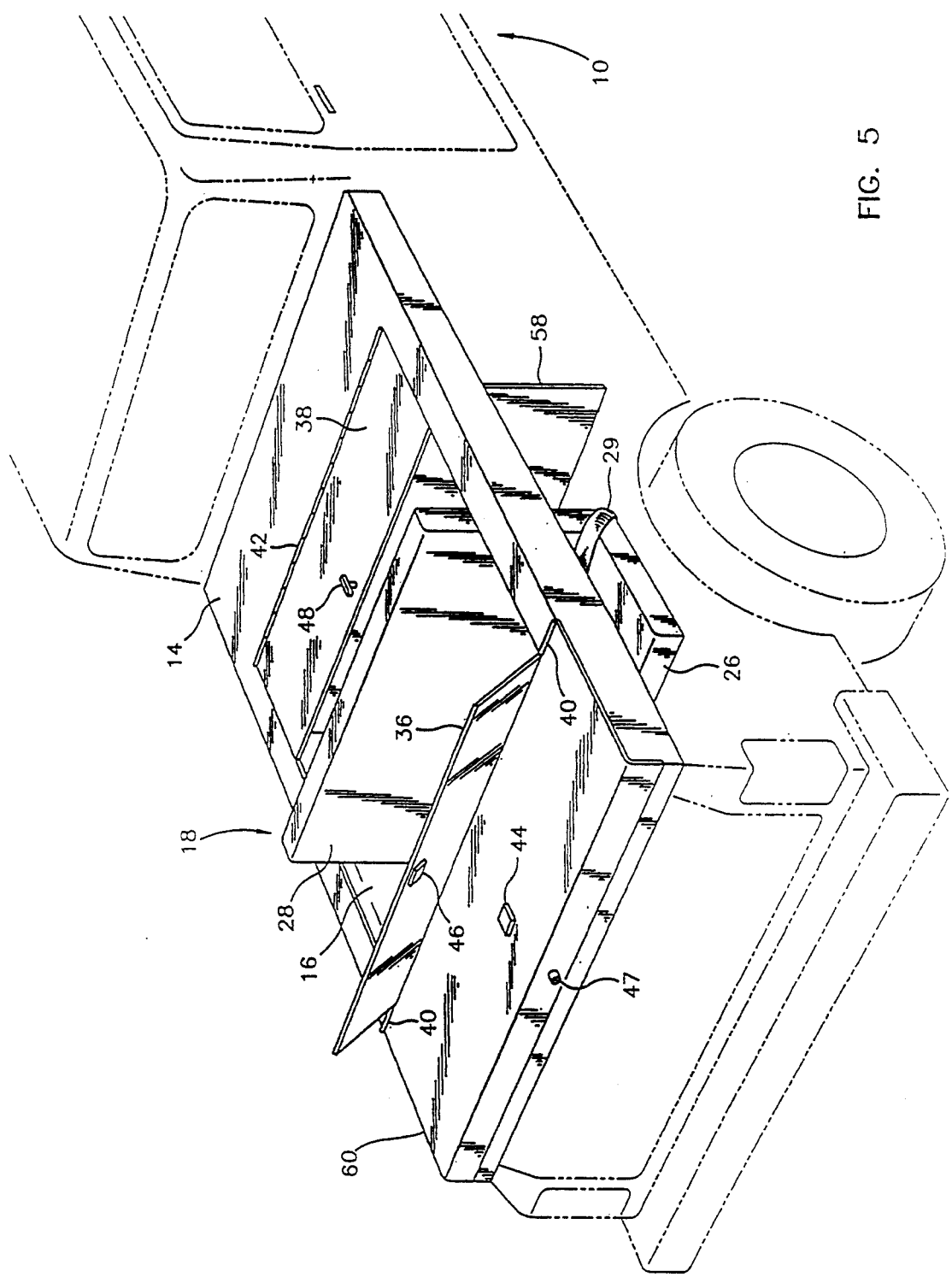
FIG. 5 is a top perspective view of the truck, with a side panel removed, and the cargo bed cover.

Due to the pivoting connection between the seat back 28 and the shell 14, the passenger seat 18 can be shifted or rotated to the position shown in FIG. 4, wherein the seat bench portion 26 is in a generally vertical orientation and the seat back portion 28 is in a generally horizontal orientation. The direction of rotation of the passenger seat 18 is indicated by the directional arrow in FIG. 1. To aid in this transition, the seat back 28 is provided with a pull type handle 34.

Two lids, a rearward lid 36 and a forward lid 38 are fitted to the shell 14 and partially cover the opening 16. Both the rearward lid 36 and the forward lid 38 are pivotally attached to the shell 14 along one of their edges by hinges 40 and 42, respectively. In order to maintain the rearward lid 36 in an open position, a magnetic catch is provided, which includes a first magnet 44 mounted on the rear portion of the shell 14 aft of the rearward lid 36 and a second magnet 46 mounted on the rearward lid 36 itself. A lock 47 is additionally preferably included for locking the rearward lid 60 in a closed position.

The forward lid 38 is provided with one of two components that make up a latching mechanism for securing the passenger seat 18 in its storage position. Thus, the forward lid 38 has a rotatable latch and handle 48 that extends therethrough and can engage with a latching member 50 that is attached to the back 28 of the passenger seat 18 when it is rotated to its storage position as shown in FIGS. 1 and 4. Preferably, the rotatable latch and handle 48 and the latching member 50 are relatively simple devices that are well known in the art of mechanical design and consist, for example, of a rotatable handle (e.g., reference numeral 48) that rotates a J-shaped plate attached thereto. The J-shaped plate engages another plate (e.g., reference numeral 50) that is attached to the seat back 28 and that has a recess for engaging the "hook" of the J-shaped plate. However, other fastening devices known in the mechanical arts could be used instead.

In order to secure the passenger seat 18 in its seating position, a pair of sliding bolt latching mechanisms 52 are located within the cargo bed adjacent the rear wheel wells. Each of the sliding bolt latching mechanisms 52 includes a sliding bolt 54 that can be manually engaged with a bracket 56 that includes an aperture for receiving and engaging with the sliding bolt 54.

With the passenger seat 18 rotated upward into the storage position, the cargo bed of the pickup truck 10 may be used for the storage and/or transportation of various items (e.g., groceries, tools, etc.), and access may be gained to the interior via the rearward lid 36. To reduce the shifting of such items toward the cab of the pickup truck 10, a partition 58, as seen most clearly in FIGS. 1 and 5, can be optionally included. The partition 58 extends downward into the cargo bed from the forward lid 38 and may be withdrawn from the interior of the cargo bed by raising the forward lid 38. Other arrangements for removing the partition 58 from the interior of the cargo bed are of course possible.

While the invention has been herein described by way of a particular preferred embodiment, various substitutions of equivalents may be effected without departing from the spirit and scope of the invention as set forth in the following claims.

What is claimed is:

1. A cargo bed cover for attachment to the cargo bed of a pickup truck to provide the pickup truck with additional passenger seating and at least one sheltered storage compartment, the cargo bed of the pickup truck comprising a cargo bed floor and upstanding cargo bed side walls, said cargo bed cover comprising:

a cover shell for attachment to the cargo bed;

means for attaching said cover shell to the cargo bed;

said cover shell extending over a substantial portion of the cargo bed when attached to the cargo bed;

at least one opening provided in said cover shell;

a passenger seat comprising a seat bench and a seat back, said seat back being disposed transversely with respect to said seat bench;

said passenger seat being disposed at least partially within said at least one opening in said cover shell;

means for shifting said passenger seat between a seating position, wherein said seat bench is in a substantially horizontal orientation and said seat back is in a substantially vertical orientation, and a storage position, wherein said seat bench is in a substantially vertical orientation and said seat back is in a substantially horizontal orientation;

said means for shifting said passenger seat comprises a pivot mounting between said passenger seat and said cover shell, said pivot mounting providing a pivoting movement of said seat back with respect to said cover shell about an axis of rotation that is substantially transverse to the longitudinal axis of the pickup truck when said cover shell is attached to the cargo bed;

at least two wheel wells extending into the cargo bed, and wherein said pivot mounting is located substantially over the wheel wells when said cover shell is attached to the cargo bed;

said cargo bed cover additionally comprising a first lid, said first lid covering a portion of said at least one opening provided in said cover shell, and wherein said first lid is removable from said at least one opening to thereby expose said portion of said at least one opening;

said first lid being located aft of said passenger seat when said cargo bed cover is mounted on the pickup truck;

said cargo bed cover additionally comprising a hinged connection between said cover shell and said first lid; and said cargo bed cover additionally comprising a magnetic latch mechanism, said magnetic latch mechanism comprising a magnet located on said cover shell and another magnet located on said first lid.

2. A cargo bed cover according to claim 1, wherein said cargo bed cover additionally comprises a second lid, said second lid covering another portion of said at least one opening in said cover shell, and wherein said second lid is removable from said at least one opening to thereby expose said another portion of said at least one opening.

3. A cargo bed cover according to claim 2, said cargo bed further comprising a hinged connection between said cover shell and said second lid.

4. A cargo bed cover according to claim 3, said cargo bed cover additionally comprising a latching mechanism for retaining said passenger seat in said storage position, said latching mechanism comprising a first latch component mounted on said passenger seat and a second latch component mounted on said second lid.

5. A cargo bed cover according to claim 4, wherein said cargo bed cover additionally comprises a partition extending downward from said cover shell and towards the bed floor to thereby effectively divide the interior of the cargo bed into a plurality of compartments.

6. A cargo bed cover according to claim 5, said cargo bed cover further comprising means for removing said partition from the interior of the cargo bed.

7. A cargo bed cover according to claim 6, said cargo bed cover additionally comprising locking means for locking said passenger seat into said seating position.

8. A cargo bed cover according to claim 7, wherein said locking means comprises a pair of sliding bolt mechanisms, one each of said pair of sliding bolt mechanisms being positioned adjacent one each of the wheel wells of the pickup truck.

9. A cargo bed cover according to claim 8, wherein said pivot mounting between said passenger seat and said cover shell is disposed on said seat back of said passenger seat, said pivot mounting being located substantially above the midpoint of said seat back when said seat back is in said substantially vertical orientation, and wherein said means for attaching said cover shell to the cargo bed comprises a pair of channels provided on said cover shell, one each of said pair of channels being located on one each of an opposing longitudinal side of said cover shell, and a pair of rails for slidingly engaging said pair of channels, one each of said pair of rails being attached to one each of the upstanding cargo bed sidewalls.

10. A cargo bed cover for attachment to the cargo bed of a pickup truck to provide the pickup truck with additional passenger seating, the cargo bed of the pickup truck having a cargo bed floor, rear wheel wells extending into the cargo bed, and upstanding cargo bed side walls, said cargo bed cover comprising:

a cover shell for attachment to the side walls of the cargo bed;
attachment means for attaching said cover shell to the side walls of the cargo bed;
said attachment means comprising a pair of rails, one each of said pair of rails being mounted on one each of the side walls of the cargo bed, and a pair of mounting channels attached to said cover shell, one each of said mounting channels being configured to slidingly mate with one each of said rails;
an interior opening passing through said cover shell;
a passenger seat, disposed beneath said opening in said cover shell when said cargo bed cover is mounted on the pickup truck, pivotally connected to the cover shell;
said passenger seat comprising a bench portion and a back portion;
said bench portion and said back portion being disposed at substantially right angles to one another;
means for selectively shifting said passenger seat between:
a first position wherein said bench portion is substantially horizontally oriented and said back portion is substantially vertically oriented; and
a second position wherein said bench portion is substantially vertically oriented and said back portion is substantially horizontally oriented;
said means for selectively shifting comprising a pivoting connection between said cover shell and said back portion;
said pivoting connection between said cover shell and said back portion being substantially disposed over the rear wheel wells of the pickup truck;
a first lid for covering a portion of said opening;
said first lid being positioned rearward of said passenger seat when said cargo bed cover is mounted on the pickup truck;
a hinge interconnecting said first lid and said cover shell;
a magnetic catch for retaining said first lid in an open position, said magnetic catch comprising one magnetic member attached to said first lid and another magnetic member attached to said cover shell;
a second lid covering another portion of said opening;
said second lid being positioned forward of said passenger seat when said cover shell is mounted on the pickup truck;
an additional hinge interconnecting said second lid and said cover shell;
a latch for retaining said passenger seat in said second position, said latch comprising a rotatable latch member mounted on said second lid and a retainer member mounted on said passenger seat;
a handle mounted on said seat back for shifting said passenger seat between said first and second positions;
a locking mechanism for retaining said passenger seat in said first position; and
a partition connected to and extending downward from said shell and towards the cargo bed floor to thereby effectively divide an interior of the cargo bed into a plurality of compartments.

11. A cargo bed cover according to claim 10, said cargo bed cover additionally comprising means for substantially removing said partition from the interior of the cargo bed, and wherein said locking mechanism comprises a pair of slide bolt locking devices, each of said slide bolt locking devices comprising a sliding bolt and a locking aperture for receiving said sliding bolt, one each of said sliding bolts being disposed on one each of the rear wheel wells and one each of said locking apertures being disposed on said seat back adjacent one each of the rear wheel wells when said passenger seat is in said first position.

* * * * *